(12) United States Patent
AlJanobi

(10) Patent No.: US 11,906,694 B2
(45) Date of Patent: Feb. 20, 2024

(54) METHOD TO ESTIMATE THE DEPTH OF THE WEATHERING LAYER USING GRAVITY RESPONSE

(71) Applicant: SAUDI ARABIAN OIL COMPANY, Dhahran (SA)

(72) Inventor: Hassan Ali AlJanobi, Tarut (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/703,555

(22) Filed: Mar. 24, 2022

(65) Prior Publication Data

US 2023/0314653 A1 Oct. 5, 2023

(51) Int. Cl.
*G01V 7/06* (2006.01)
*G01V 1/42* (2006.01)
*G01V 11/00* (2006.01)

(52) U.S. Cl.
CPC .............. *G01V 7/06* (2013.01); *G01V 1/42* (2013.01); *G01V 11/00* (2013.01); *G01V 2210/1299* (2013.01); *G01V 2210/1425* (2013.01); *G01V 2210/622* (2013.01)

(58) Field of Classification Search
CPC . G01V 7/06; G01V 1/42; G01V 11/00; G01V 2210/1299; G01V 2210/1425; G01V 2210/622
See application file for complete search history.

(56) References Cited

U.S. PATENT DOCUMENTS

| | | | | |
|---|---|---|---|---|
| 2009/0287464 A1* | 11/2009 | Barnes | ............ | G01V 3/38 |
| | | | | 703/2 |
| 2011/0264430 A1* | 10/2011 | Tapscott | ............ | G01V 99/00 |
| | | | | 703/10 |
| 2014/0081595 A1* | 3/2014 | White | ............ | G01V 7/16 |
| | | | | 702/154 |

OTHER PUBLICATIONS

Capriotti, Joseph et al., "Equivalent source processing of vector gravity data"; SEG Technical Program Expanded Abstracts 2019; pp. 1764-1768; Aug. 10, 2019 (5 pages).
Dampney, C. N. G., "The Equivalent Source Technique"; Geophysics; vol. 34, Issue 1; pp. 39-53; Feb. 1969 (15 pages).
(Continued)

*Primary Examiner* — Alessandro V Amari
*Assistant Examiner* — Christian T Bryant
(74) *Attorney, Agent, or Firm* — Osha Bergman Watanabe & Burton LLP

(57) ABSTRACT

A method to estimate a depth profile of a weathering layer in a subterranean formation of a field is disclosed. The method includes obtaining gravity survey data of the field, generating an equivalent source density profile based on the gravity survey data, wherein the equivalent source density profile describes a set of equivalent gravitational sources to substitute rock layers of the subterranean formation, generating an equivalent source gravity response based on the equivalent source density profile, wherein the equivalent source gravity response excludes a gravity contribution from the weathering layer, calculating a separated weathering layer gravity response based on a difference between the gravity survey data and the equivalent source gravity response, wherein the separated weathering layer gravity response corresponds to the gravity contribution from the weathering layer, and generating a modeled weathering layer depth profile based on the separated weathering layer gravity response.

11 Claims, 8 Drawing Sheets

(56) References Cited

OTHER PUBLICATIONS

Li, Yaoguo, "Processing gravity gradiometer data using an equivalent source technique"; SEG Technical Program Expanded Abstracts 2001; pp. 1466-1469; Sep. 2001 (4 pages).
Barnes, Gary et al., "Imaging geologic surfaces by inverting gravity gradient data with depth horizons"; Geophysics; vol. 77, Issue 1; pp. G1-G11; Jan.-Feb. 2012 (11 pages).
Siqueira, Filipe C. L. et al., "Fast iterative equivalent-layer technique for gravity data processing: a method grounded on excess mass constraint"; Geophysics; vol. 82, Issue 4; pp. G57-G69; Jul.-Aug. 2017 (13 pages).

\* cited by examiner

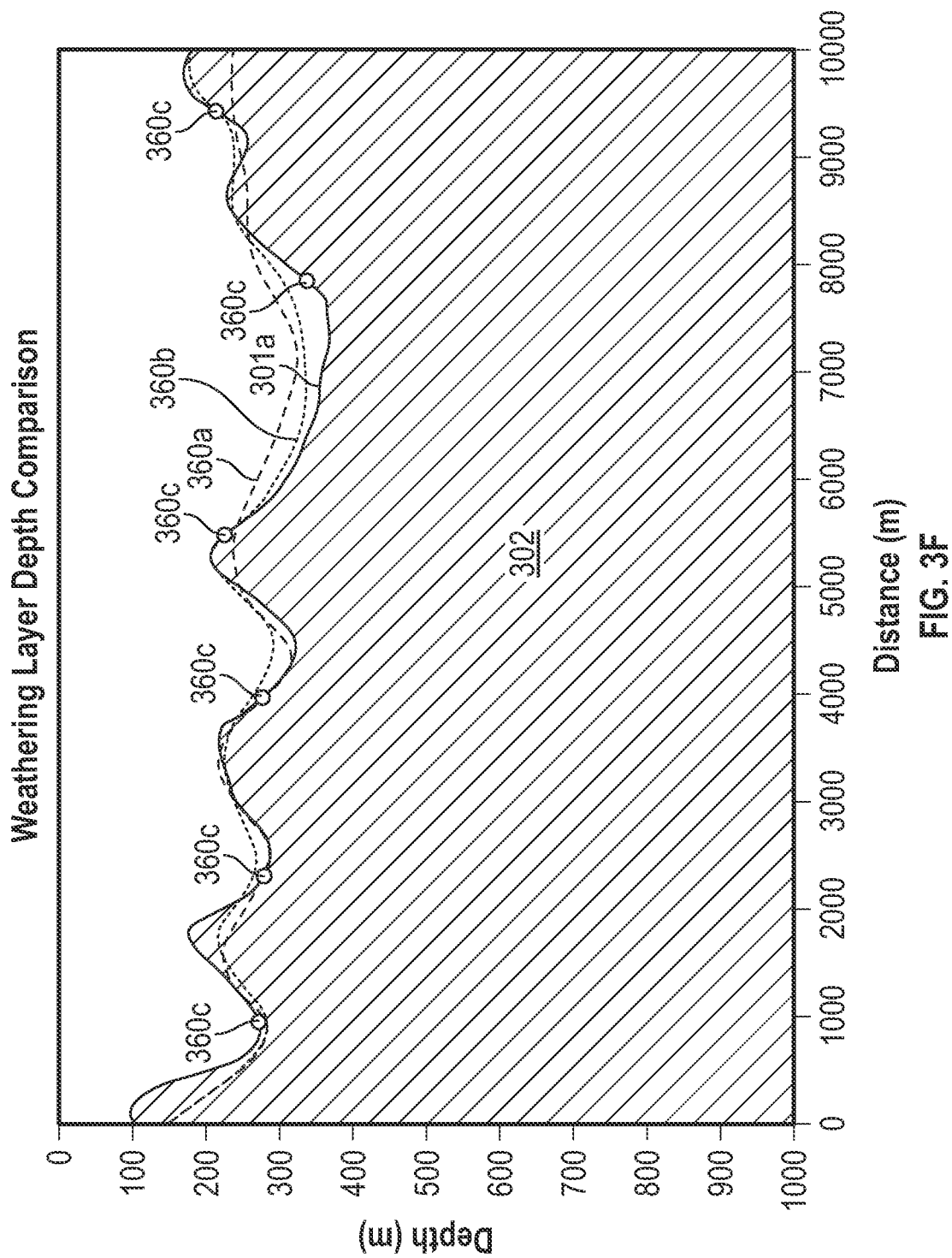

METHOD TO ESTIMATE THE DEPTH OF THE WEATHERING LAYER USING GRAVITY RESPONSE

BACKGROUND

The weathering layer is a near-surface layer in an earth formation. The top of the weathering layer is the earth surface. The base of the weathering layer commonly coincides with the water table with a sharp increase in seismic velocity. In the context that the earth surface is nominally flat as compared to thickness variations of the weathering layer, the thickness of the weathering layer is essentially the same as the depth where the base of the weathering layer is located. Throughput this disclosure, the terms "thickness" and "depth" of the weathering layer are used interchangeably and refer to where the base of the weathering layer is located. Near-surface variations of the weathering layer can degrade desired response of seismic sensor arrays and result in challenges in seismic data processing. For example, the base of the weathering layer may not be accurately determined based on seismic interpretation due to such near-surface variations.

Gravity survey refers to measurements, by air or on land, of the gravity field at a series of different locations over an area of interest. The earth's gravity field is affected by the density of different types of rocks. Precision instruments known as gravimeters are used to measure the changes in the gravity field. Gravity surveys to map these gravity field differences can be used by oilfield developers or drillers to help locate certain rock formation layers.

Seismic uphole survey refers to a seismic survey technique in which seismic sources are energized within a borehole and arrival times are recorded by surface geophones. Seismic uphole survey may be used particularly to determine weathering layer velocity.

Linear inversion refers to finding the solution of a linear operator equation. The linear inversion problem may be referred to as ill-posed when a solution fails to exist, is non-unique, or is unstable with respect to small perturbations in the linear operator equation. Tikhonov regularization is a technique to stabilize the solution of the linear inverse problem based on a regularization parameter, which controls fitting parameters of the linear inversion.

SUMMARY

In general, in one aspect, the invention relates to a method to estimate a depth profile of a weathering layer in a subterranean formation of a field. The method includes obtaining gravity survey data of the field, generating an equivalent source density profile based on the gravity survey data, wherein the equivalent source density profile describes a set of equivalent gravitational sources to substitute rock layers of the subterranean formation, generating an equivalent source gravity response based on the equivalent source density profile, wherein the equivalent source gravity response excludes a gravity contribution from the weathering layer, calculating a separated weathering layer gravity response based on a difference between the gravity survey data and the equivalent source gravity response, wherein the separated weathering layer gravity response corresponds to the gravity contribution from the weathering layer, and generating a modeled weathering layer depth profile based on the separated weathering layer gravity response.

In general, in one aspect, the invention relates to an analysis and modeling system for estimating a depth profile of a weathering layer in a subterranean formation of a field The analysis and modeling system includes a computer processor, and memory storing instructions, when executed causing the computer processor to obtain gravity survey data of the field, generate an equivalent source density profile based on the gravity survey data, wherein the equivalent source density profile describes a set of equivalent gravitational sources to substitute rock layers of the subterranean formation, generate an equivalent source gravity response based on the equivalent source density profile, wherein the equivalent source gravity response excludes gravity contribution from the weathering layer, calculate a separated weathering layer gravity response based on a difference between the gravity survey data and the equivalent source gravity response, wherein the separated weathering layer gravity response corresponds to the gravity contribution from the weathering layer, and generate a modeled weathering layer depth profile based on the separated weathering layer gravity response.

In general, in one aspect, the invention relates to a system for estimating a depth profile of a weathering layer in a subterranean formation of a field. The system includes a gravity survey system configured to obtain gravity survey data of the field, and an analysis and modeling system configured to generate an equivalent source density profile based on the gravity survey data, wherein the equivalent source density profile describes a set of equivalent gravitational sources to substitute rock layers of the subterranean formation, generate an equivalent source gravity response based on the equivalent source density profile, wherein the equivalent source gravity response excludes gravity contribution from the weathering layer, calculate a separated weathering layer gravity response based on a difference between the gravity survey data and the equivalent source gravity response, wherein the separated weathering layer gravity response corresponds to the gravity contribution from the weathering layer, and generate a modeled weathering layer depth profile based on the separated weathering layer gravity response.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 3A, 3B, 3C, 3D, 3E, and 3F show an example in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of this disclosure provide a method to estimate weathering layer depth values using gravity response in a field. In particular, a modeled weathering layer depth profile is generated using an equivalent source method of gravity response, which is a numerical method to analyze and model gravity data based on the principle that the gravity field of arbitrarily shaped rock layers can be substituted by a number of equivalent gravitational sources on a fictitious plane, referred to as the equivalent source layer. In one or more embodiments, gravity survey data of the field is obtained, an equivalent source density profile is generated based on the gravity survey data, where the equivalent source density profile describes a set of equivalent gravitational sources to substitute rock layers of the subterranean formation, an equivalent source gravity response is generated based on the equivalent source density profile, where the equivalent source gravity response excludes gravity contribution from the weathering layer, a separated weathering layer gravity response is calculated based on a difference between the gravity survey data and the equivalent source gravity response, wherein the separated weathering layer gravity response corresponds to the gravity contribution from the weathering layer, and the modeled weathering layer depth profile is generated based on the separated weathering layer gravity response. The modeled weathering layer depth profile is used to facilitate development operations of the field, such as exploration operation, drilling operation, production operation, etc. of oil/gas wells in the field.

Figure 1A:
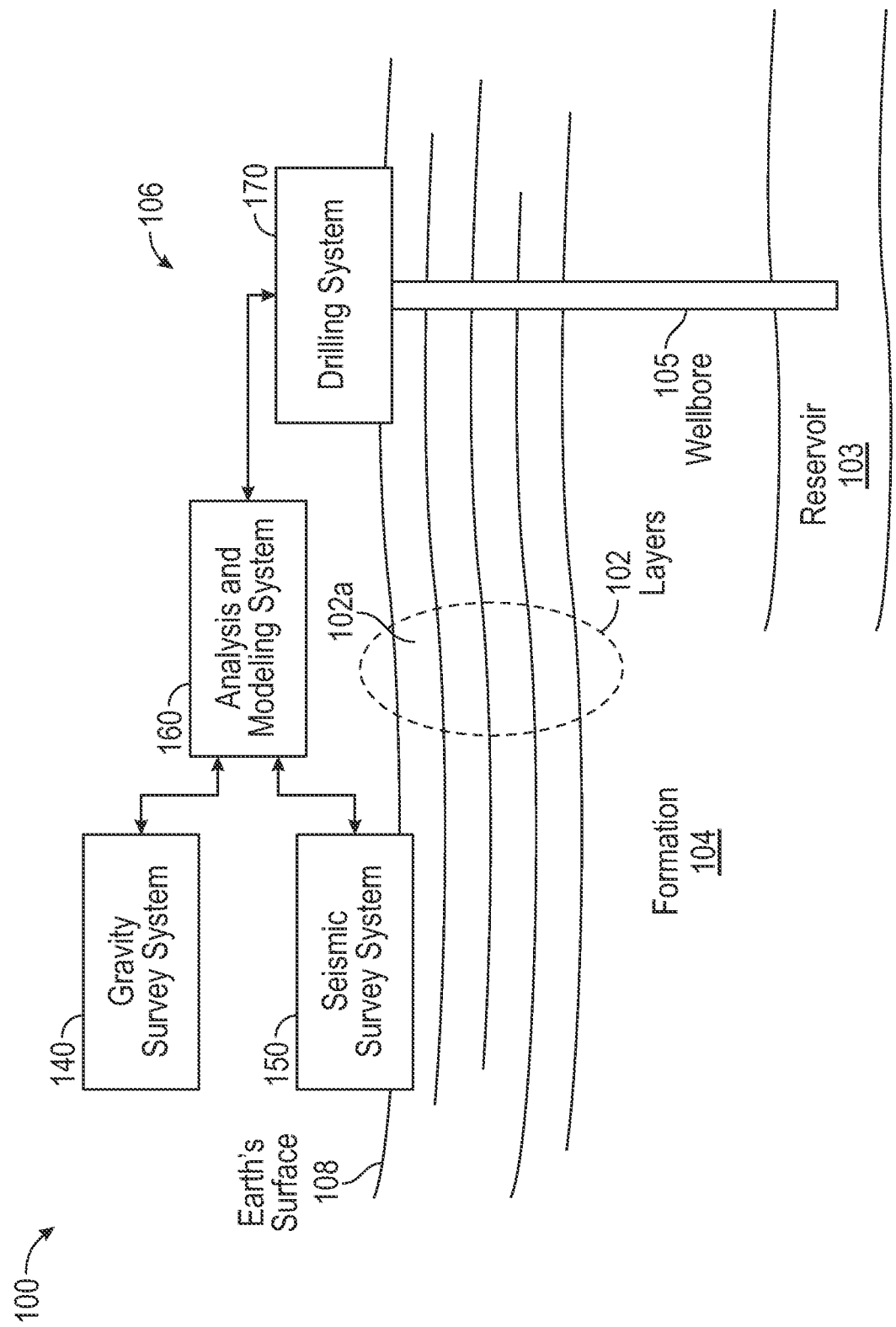
FIGS. 1A and 1B show systems in accordance with one or more embodiments.

FIG. 1A shows a schematic diagram in accordance with one or more embodiments. As shown in FIG. 1A, a field environment (100) includes a subterranean formation ("formation") (104) and a field development system (106). The formation (104) may include a porous or fractured rock formation that resides underground, beneath the Earth's surface ("surface") (108). The formation (104) may include different layers (102) of rock having varying characteristics, such as varying degrees of permeability, porosity, capillary pressure, and resistivity. For example, the layers (102) include a weathering layer (102a). In the case of the field development system (106) being for developing an oilfield, the formation (104) may include a hydrocarbon-bearing reservoir (103).

In some embodiments disclosed herein, the field development system (106) includes a gravity survey system (140), a seismic survey system (150), an analysis and modeling system (160), and a drilling system (170). For example, the gravity survey system (140) may include gravimeters that measure the Earth's gravity field across the field environment (100). The seismic survey system (150) may include seismic sources that generate sound waves propagating into the formation (104) and seismic sensor arrays that output electrical signals representing reflected sound waves from the layers (102). The gravity and seismic information generated by the gravity survey system (140) and seismic survey system (150) are provided, directly or indirectly, to the analysis and modeling system (160) to characterize different layers (102) of the formation (104). The output results of the analysis and modeling system (160) are used to facilitate the drilling system (170) to perform drilling operation of the wellbore (105). For example, the drilling system (170) may include a rig, drill string, drilling fluid circulation system, and other associated equipment and control mechanisms. In addition, the wellbore (105) may penetrate the layers (102) to reach the reservoir (103) for performing oilfield production operations within the field environment (100).

For example, the analysis and modeling system (160) may include hardware and/or software with functionality to analyze or otherwise model the results of gravity survey and seismic survey performed by the gravity survey system (140) and seismic survey system (150). In some embodiments, the analysis and modeling system (160) includes a computer system, such as a portion of the computing system described in reference to FIGS. 4A-4B below.

While the analysis and modeling system (160) is shown in the vicinity of the gravity survey system (140), seismic survey system, and/or drilling system (170) in FIG. 1A, those skilled in the art will appreciate that the analysis and modeling system (160) may also be remotely located away from the gravity survey system (140), seismic survey system, and/or drilling system (170).

Figure 1B:
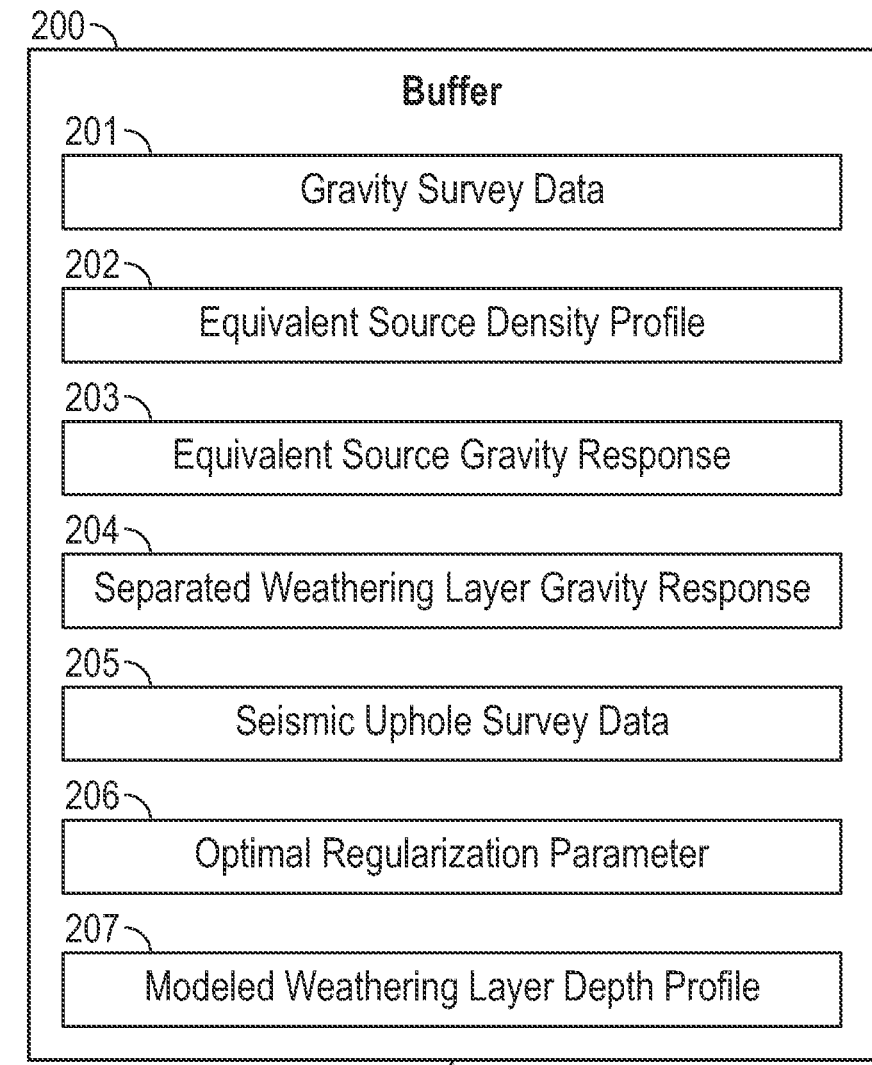
Figure 1B:
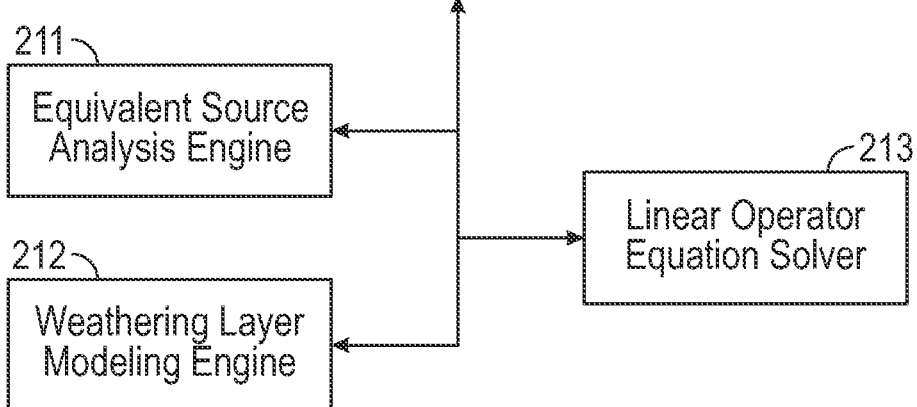

FIG. 1B expands on the analysis and modeling system (160) depicted in FIG. 1A above. In one or more embodiments, one or more of the modules and/or elements shown in FIG. 1B may be omitted, repeated, combined and/or substituted. Accordingly, embodiments disclosed herein should not be considered limited to the specific arrangements of modules and/or elements shown in FIG. 1B.

Figure 4A:
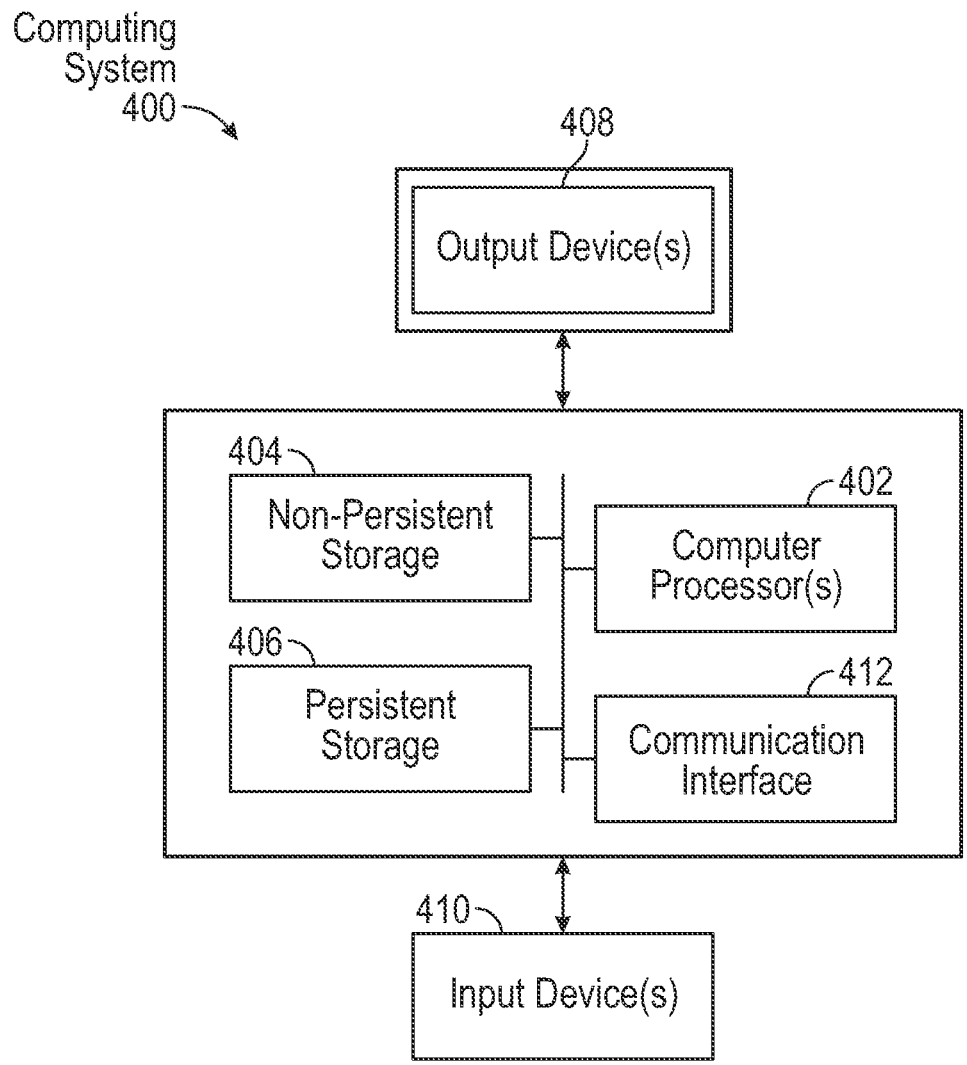
FIGS. 4A and 4B show a computing system in accordance with one or more embodiments.
Figure 4B:
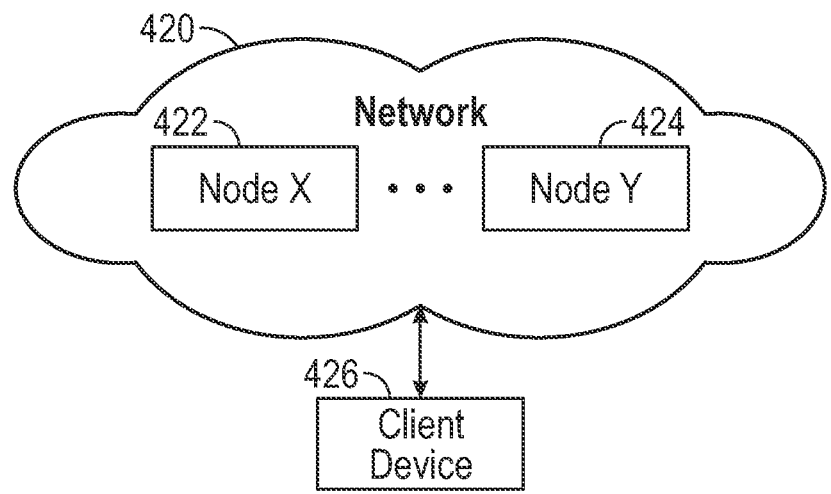

As shown in FIG. 1B, the analysis and modeling system (160) has multiple components. For example, the analysis and modeling system (160) has a buffer (200), an equivalent source analysis engine (211), a weathering layer modeling engine (212), and a linear operator equation solver (213). Each of these components (211, 212, 213) may be located on the same computing device (e.g., personal computer (PC), laptop, tablet PC, smart phone, multifunction printer, kiosk, server, etc.) or on different computing devices that are connected via a network, such as a wide area network or a portion of Internet of any size having wired and/or wireless segments. The computing device(s) may be such as shown in FIGS. 4A-4B. Each of these components is discussed below.

In one or more embodiments, the buffer (200) may be implemented in hardware (i.e., circuitry), software, or any combination thereof. The buffer (200) is configured to store data generated and/or used by the analysis and modeling system (160). The data stored in the buffer (200) includes the gravity survey data (201), the equivalent source density profile (202), the equivalent source gravity response (203), the separated weathering layer gravity response (204), the seismic uphole survey data (205), the optimal regularization parameter (206), and the modeled weathering layer depth profile (207).

The gravity survey data (201) is a set of measurements of a gravity survey of an area of interest in the field environment (100). For example, the gravity survey data (201) may include gravimeter measurements organized (e.g., as a plotted curve or in a vector format) with respect to a distance from a reference location in the area of interest. In the sense that the measurements are based on the response of the gravimeter to the gravity field, the gravity survey data (201) may also be referred to as observed gravity response.

The equivalent source density profile (202) is a set of density values of equivalent sources on a fictitious plane (referred to as an equivalent source layer) at a nominal depth (referred to as the equivalent source layer depth) in the field environment (100). For example, the density values may be organized (e.g., as a plotted curve or in a vector format) with respect to a distance from the reference location in the area of interest. The density value corresponds to the mass of each equivalent source divided by the distance between adjacent equivalent sources. When applying the equivalent source method of gravity response to analyze and model the formation (104), the rock layers (102) are substituted by the equivalent source layer that produces similar gravity response as the rock layers (102) themselves.

The equivalent source gravity response (203) is a set of denoised data derived from the gravity survey data (201) using the equivalent source method of gravity response. The equivalent source layer is set up at a selected depth below the earth surface (108) such that the equivalent source gravity response (203) may be considered as free from the shallower gravity response and gravimeter noise. For example, the equivalent source location may be set at the base of the weathering layer which can be estimated based on seismic data.

The separated weathering layer gravity response (204) is the difference between the equivalent source gravity response (203) and the gravity survey data (201). For example, the separated weathering layer gravity response (204) may be calculated by subtracting the equivalent source gravity response (203) from the gravity survey data (201). The separated weathering layer gravity response (204) may be filtered or otherwise adjusted to remove any remaining noise. For example, upward continuation may be applied to smooth the separated weathering layer gravity response (204). The upward continuation is a process similar to the low pass filter while preserving the frequency content of the data.

The seismic uphole survey data (205) is a set of seismic data of the area of interest in the field environment (100). The seismic uphole survey data (205) may be processed to derive a set of estimated weathering layer depth values at selected locations in the area of interest.

The optimal regularization parameter (206) is a selected optimal or quasi-optimal value of the control parameter for stabilizing a solution of a linear operator equation of the gravity profile, or more specifically, linear inversion of the separated weathering layer gravity response (204).

The modeled weathering layer depth profile (207) is a set of predicted depth values of the weathering layer (102a) organized (e.g., as a plotted curve or in a vector format) with respect to a distance from the reference location in the area of interest. The modeled weathering layer depth profile (207) is generated by linear inversion of the separated weathering layer gravity response (204). The linear inversion is constrained using the seismic uphole survey data (205), or more specifically using the estimated weathering layer depth values derived from the seismic uphole survey data (205).

In one or more embodiments, each of the equivalent source analysis engine (211), weathering layer modeling engine (212), and linear operator equation solver (213) may be implemented in hardware (i.e., circuitry), software, firmware or any combination thereof. These engines and solver collectively address the challenge of seismic data processing due to the near-surface weathering layer. As described in detail below, these engines and solver collectively perform joint inversion of gravity and seismic data to improve the estimated depth of the weathering layer by way of separating the gravity response of the weathering layer from the observed gravity profile.

In one or more embodiments, the equivalent source analysis engine (211) generates the equivalent source density profile (202) from the gravity survey data (201). For example, the equivalent source analysis engine (211) may employ the linear operator equation solver (213) to generate the equivalent source density profile (202).

In one or more embodiments, the weathering layer modeling engine (212) generates the separated weathering layer gravity response (204) from the equivalent source density profile (202) and the gravity survey data (201). The weathering layer modeling engine (212) further generates the modeled weathering layer depth profile (207) from the separated weathering layer gravity response (204). For example, the equivalent source analysis engine (211) may employ the linear operator equation solver (213) to generate the modeled weathering layer depth profile (207).

In one or more embodiments, the linear operator equation solver (213) solves ill-posed linear operator equations using Tikhonov regularization to stabilize the solutions. In particular, the linear operator equation solver (213) selects, based on a L-curve method, and uses the optimal regularization parameter (206) for the Tikhonov regularization. To perform the linear inversion, an least-square approach is used to minimize the Tikhonov parametric function with the depth of the equivalent source layer and the regularization parameter as inputs.

In one or more embodiments, the analysis and modeling system (160) performs the functionalities described above using the method described in reference to FIG. 2 below. Although the analysis and modeling system (160) is shown as having three engines (211, 212, 213), in other embodiments of the invention, the analysis and modeling system (160) may have more or fewer engines and/or more or fewer other components. Further, the functionality of each component described above may be split across components or combined into a single, more robust component. Further still, each component (211, 212, 213) may be utilized multiple times to carry out an iterative operation.

Figure 2:
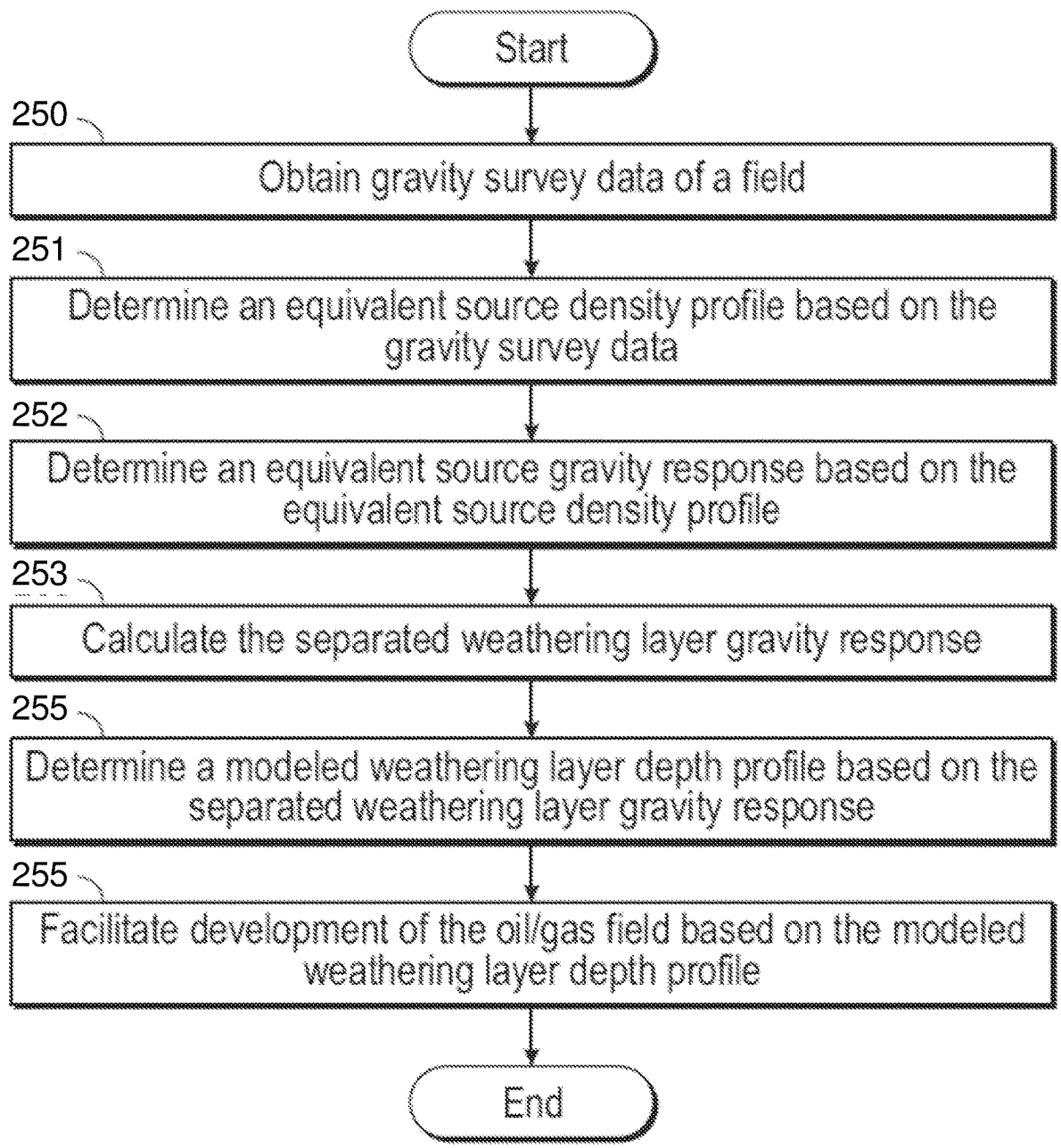
FIG. 2 shows a method flowchart in accordance with one or more embodiments.

Turning to FIG. 2, FIG. 2 shows a method flowchart in accordance with one or more embodiments. One or more blocks in FIG. 2 may be performed using one or more components as described in FIGS. 1A and 1B. While the various blocks in FIG. 2 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially in Block 250, gravity data from a gravity survey of a field is obtained as an input gravity response for analysis and modeling. The gravity data includes measurements of vertical gravity field(s) across the field.

In Block 251, an equivalent source density profile is generated based on the gravity data from the gravity survey. The gravity survey data is expressed in the general matrix notation as:

$$d^{obs}=Gm \qquad (1)$$

In Eq. (1), $d^{obs}$ denotes gravity data in a vector column format where each vector element is a measurement of vertical gravity field at a corresponding location in the field, m denotes the equivalent source density profile in a vector column format where each vector element is a modeled density at a particular equivalence source location of the equivalence source layer, and G denotes the sensitivity matrix describing the relationship between the equivalent source locations and the gravity measurement observation points. For example, the equivalent source location may be set at the rocks basement that is below the sedimentary platform which is metamorphic or igneous in origin. By placing the equivalent source layer around the basement rocks, that is very deep compared to the base of the weathering layer, the equivalent source method will treat the response of the weathering layer as noise. Therefore the difference between the gravity survey data and the equivalent source gravity response corresponds to the WL gravity response.

To use the equivalent source method of gravity response, the equivalent source density profile is generated by solving the linear inversion problem of Eq. (1). The inversion of the gravity data is an ill-posed problem where regularization is used to obtain a stable solution by minimizing the Tikhonov parametric function $\phi$:

$$\phi = \phi_d + \alpha \phi_m \tag{2}$$

In E. (2), $\alpha$ is the regularization parameter and $\phi_d$ is the data misfit measure representing the difference between the observed and the predicted data. In addition, $\phi_m$ is the model objective functional which quantifies the structure of the equivalent sources. Solving Eq. (2) using the least-square approach, the inverted solution M of the equivalent source density profile is:

$$M = (G^T G + \alpha W^T W)^{-1} G^T d^{obs} \tag{3}$$

In Eq. (3), W is the model weighting matrix which is used to quantify the model roughness. Superscript T indicates the transpose of a matrix. In one or more embodiments, an optimal regularization parameter is selected based on a plotted curve of possible values of $\phi_d$ versus $\phi_m$ on a logarithmic-to-logarithmic (Log-Log) scale. The plotted curve is referred to as a L-curve based on the L-shape of the curve.

In Block 252, the equivalent source gravity response is generated based on the inverted solution M of the equivalent source density profile. Specifically, the equivalent source gravity response is calculated as a noise-free dataset using the following equations:

$$d^{new} = GM \tag{4}$$

$$d^{new} = G(G^T G + \alpha W^T W)^{-1} G^T d^{obs} \tag{5}$$

In Eq. (4) and Eq. (5), d new denotes the equivalent source gravity response.

In Block 253, the separated weathering layer gravity response is calculated using the following equation:

$$d^{WL} = d^{obs} - d^{new} \tag{6}$$

In Eq. (6), $d^{WL}$ denotes the modeled weathering layer depth profile.

In Block 254, the modeled weathering layer depth profile is generated based on the separated weathering layer gravity response. Specifically, the separated weathering layer gravity response is inverted to generate the modeled weathering layer depth profile using Eq. (7) below:

$$WM = (G^T G + \alpha W^T W)^{-1} G^T d^{WL} \tag{7}$$

In Eq. (7), WM denotes the modeled weathering layer depth profile. In one or more embodiments, the separated weathering layer gravity response is inverted using seismic uphole data as constraint to generate the modeled weathering layer depth profile. As noted above, the inversion of the gravity data is an ill-posed problem with non-unique solutions. A particular one of the non-unique solutions that is consistent with the seismic uphole data is selected as the modeled weathering layer depth profile.

In Block 255, the modeled weathering layer depth profile is used to improve accuracy of seismic data processing thus facilitating development of an oil/gas field, such as optimizing a drilling operation.

FIGS. 3A-3F show an example in accordance with one or more embodiments. The example shown in FIGS. 3A-3F is based on the system and method described in reference to FIGS. 1A-1B and 2 above. One or more of the modules and/or elements shown in FIGS. 3A-3F may be omitted, repeated, combined and/or substituted.

Figure 3A:
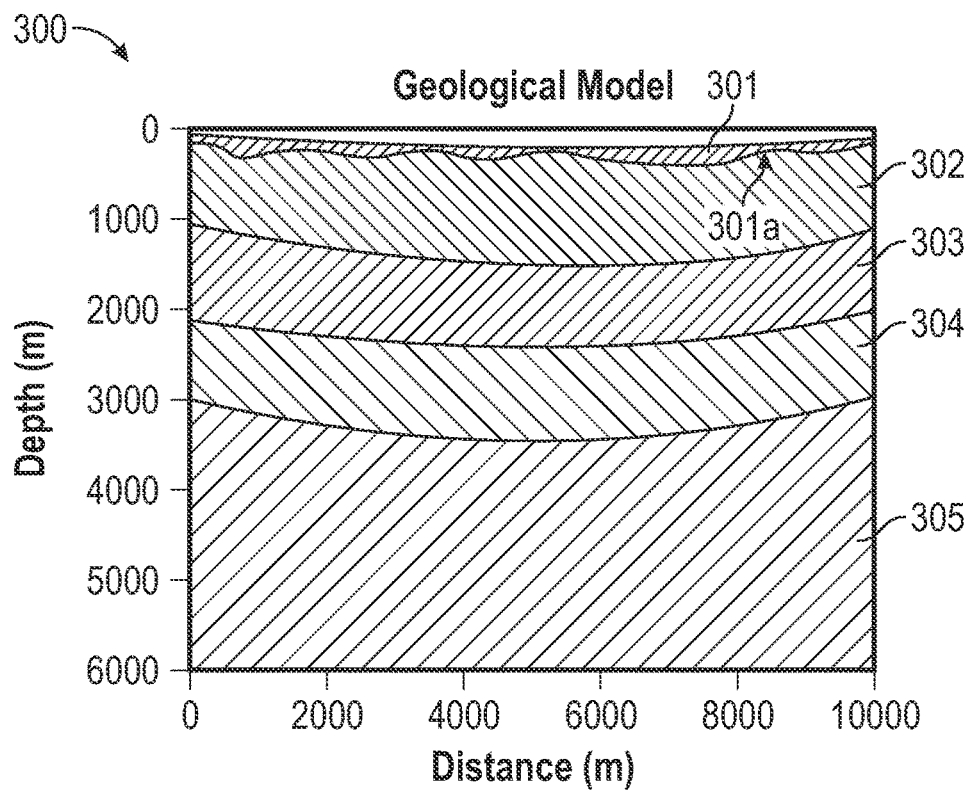
Figure 3A:
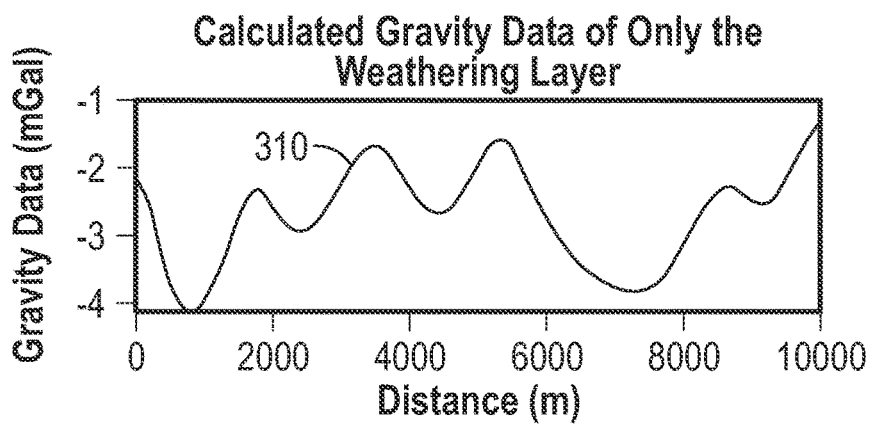
Figure 3B:
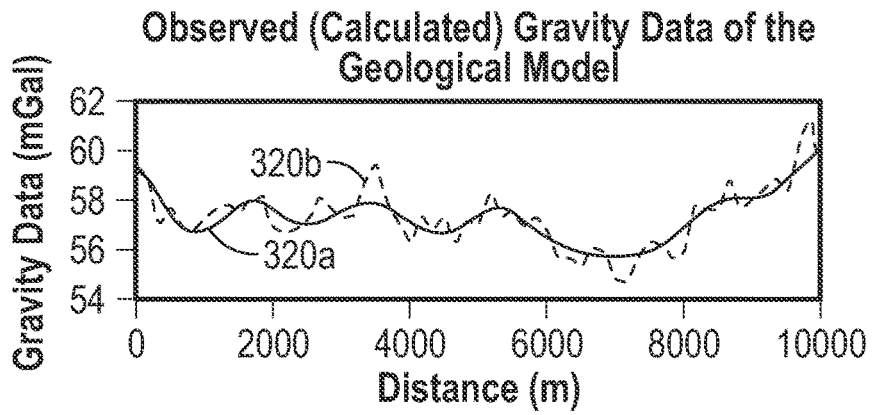
Figure 3C:
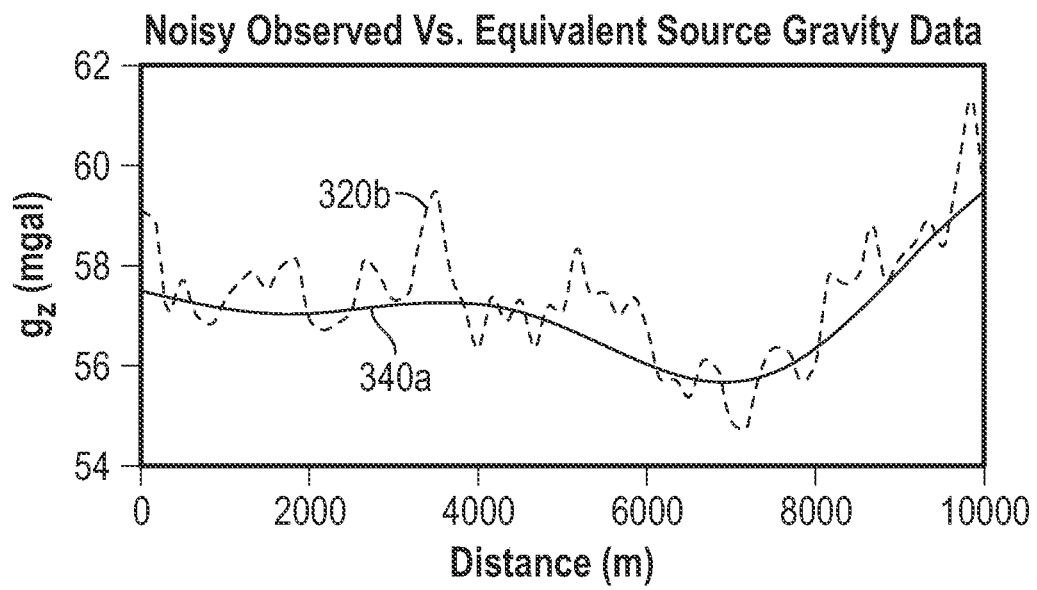
Figure 3D:
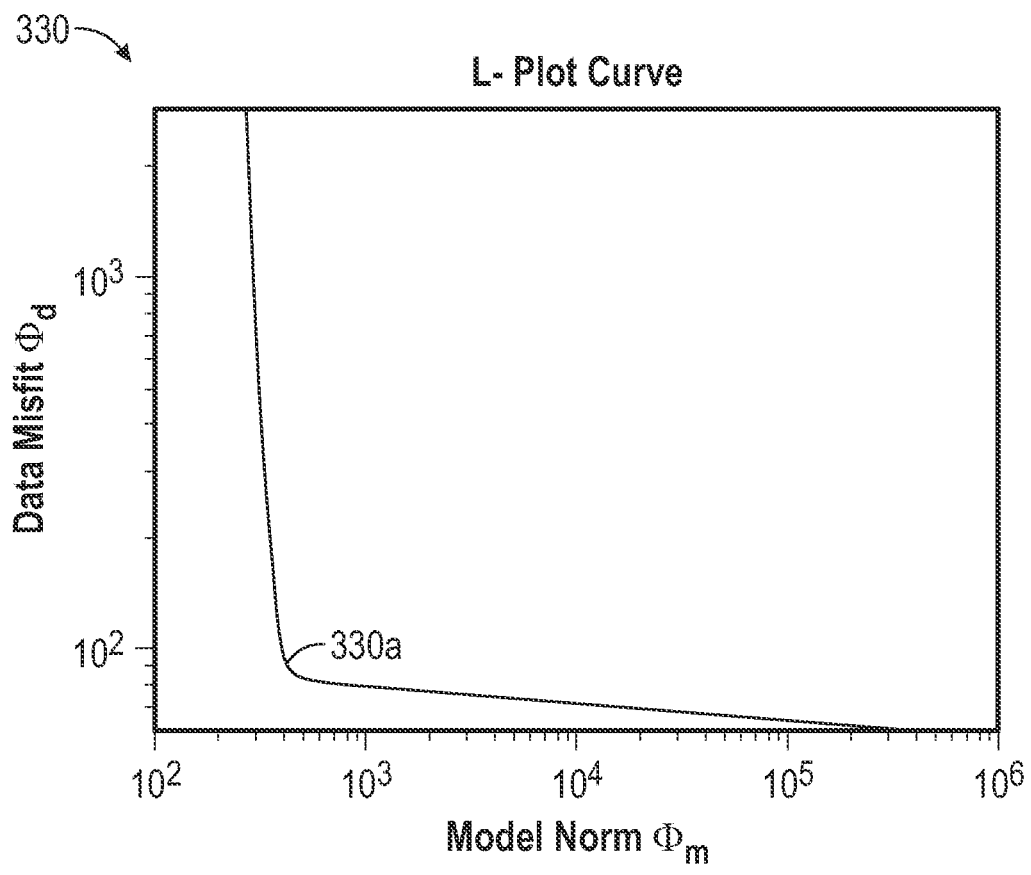
Figure 3E:
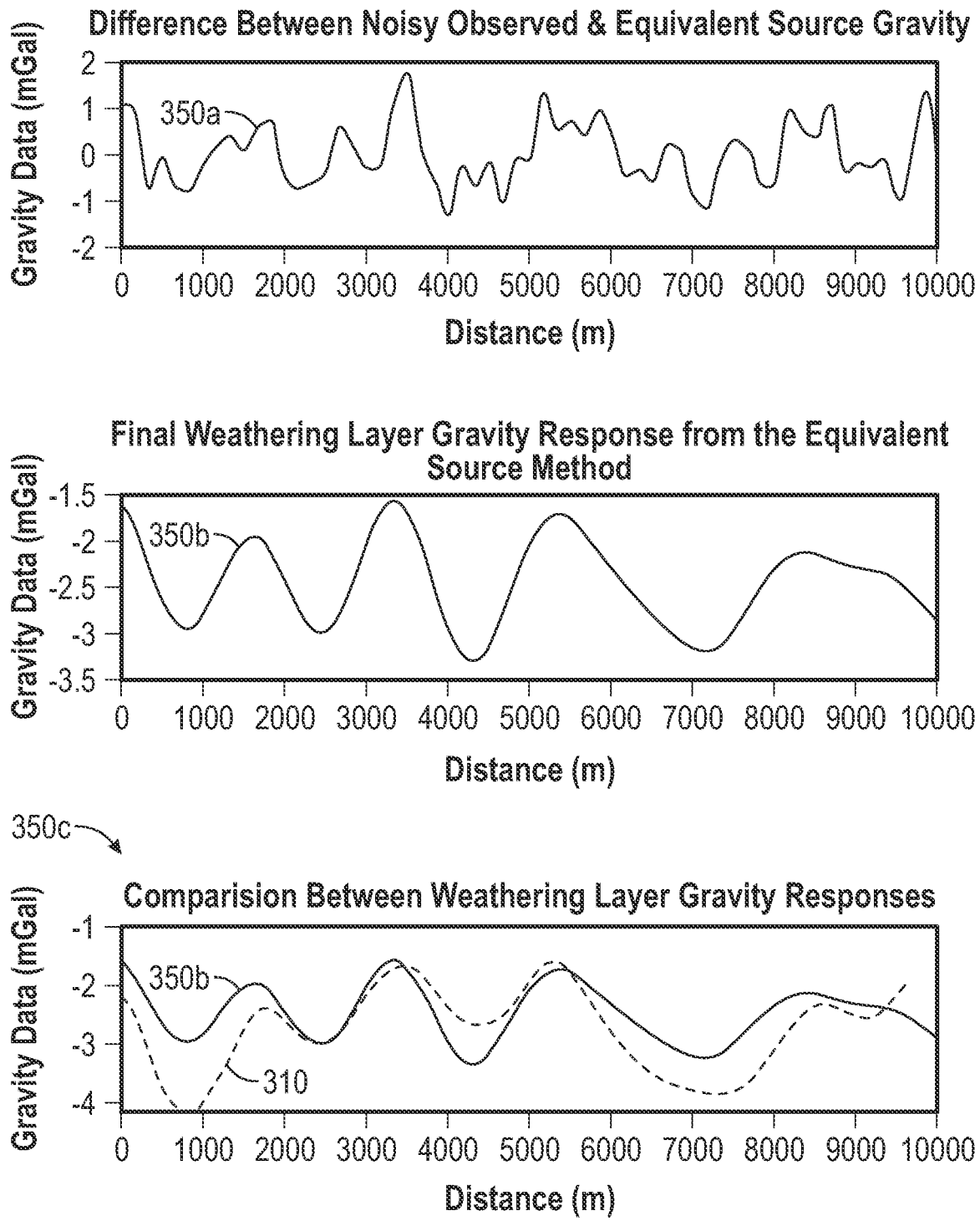

The example shown in FIGS. 3A-3F illustrates the efficacy of the method to estimate the depth of the weathering layer using gravity response. In particular, FIGS. 3A-3B shows an example synthetic model of the earth formation and weathering layer. FIGS. 3C-3E shows an example of estimating the depth of the weathering layer using gravity response of the synthetic model. FIG. 3F shows a comparison between the modeled weathering layer depth profile generated using the method and the pre-defined weathering layer depth profile in the synthetic model to illustrate a consistent match.

There are two main factors that control the output gravity response of the equivalent source method, namely the depth of the equivalent source layer and the choice of the regularization parameter. A shallow depth of the equivalent source layer or a small regularization parameter generally result in minor data attenuation and partial loss of the weathering layer response. Whereas a deeper equivalent source layer or a larger regularization parameter generally result in a smooth output and partial weathering layer separation. In the example described below, the depth of the equivalent source layer is selected as approximately the depth of the rocks basement below the sedimentary platform, and a regularization parameter is selected based on the L-curve method to provide the best results. There are two advantages of using the L-curve, it provides the optimal value of the regularization parameter for the chosen depth and it is parameter-independent, resulting in a robust workflow that separate the response of the weathering layer from the observed gravity response.

FIG. 3A shows a synthetic geological model (300) representing a portion of the formation that hypothetically exists in nature. The synthetic geological model (300) includes pre-defined boundaries between hypothetical rock formation layers (301, 302, 303, 304, 305). In particular, the layer (301) is the weathering layer where the top is the earth surface and the bottom is the base of the weathering layer. The base of the weathering layer is at the interface (301a) between the weathering layer (301) and the underlying layer (302). The weathering layer depth profile corresponds to the depth profile of the interface (301a). In a hypothetical gravity survey of the synthetic geological model (300), the contribution of the weathering layer (301) to the gravity data is mathematically calculated as the curve (310). The curve (310) is plotted with respect to a distance from the origin of the horizontal axis that corresponds to locations along the earth surface of the synthetic geological model (300).

FIG. 3B shows the gravity response of the synthetic geological model (300). As shown in FIG. 3B, the curve (320a) represents mathematically calculated gravity data contributed from all hypothetical rock formation layers (301, 302, 303, 304, 305). The curve (320b) is generated by resampling the curve (320a) with Gaussian noise to simulate gravimeter measurements of the hypothetical gravity survey. Accordingly, the curve (320b) is an example of the gravity survey data (201) for performing the equivalent source method of gravity response of the synthetic geological model (300).

FIG. 3C shows an example curve (340a) of the equivalent source gravity response (203). Specifically, the curve (340a) is generated using the curve (320b) (replicated from FIG. 3B above) as the gravity survey data (201) for performing the equivalent source method of gravity response of the synthetic geological model (300). As shown in FIG. 3C, the curve (340a) is the denoised gravity data of the synthetic geological model (300) and is consider free from the shallower gravity response and gravimeter noise. Accordingly, the difference between the two curves (320b) and (340a) is an example of the separated weathering layer gravity response (204) with certain remaining noise.

FIG. 3D shows an example L-curve plot (330) used in selecting the optimum regularization parameter for performing the equivalent source method of gravity response. The L-curve method is a simple graphical tool for quasi-optimal selection of the regularization parameter. The L-curve graphical tool is based on plotting all possible a of the misfit functional $\phi_d$ versus stabilizing functional $\phi_m$ in a log-log scale. The produced curve has an L-shape appearance, where the quasi-optimal value of the regularization parameter is at the corner (330a) of the L-curve, which is an example of the optimal regularization parameter (206).

FIG. 3E shows a curve (350a), which is the difference between the two curves (320b) and (340a) shown in FIG. 3C above. As noted above, the curve (350a) is an example of the separated weathering layer gravity response (204) with noise. FIG. 3E also shows a curve (350b), which is derived from the curve (350a) to remove the noise, e.g., by shifting and filtering using upward continuation of 1500 m. The curve (350b) is an example result of the equivalent source method of gravity response, i.e., an example of the separated weathering layer gravity response (204) with noise removed. In addition, FIG. 3E shows a comparison between the example curve (350b) of the separated weathering layer gravity response (204) and the example curve (310) (replicated from FIG. 3A above) of the pre-defined contribution of the weathering layer (301) to the gravity data. The gravity response comparison shows good agreement between the example result of the equivalent source method of gravity response and the pre-defined weathering layer (301) in the synthetic geological model (300).

FIG. 3F shows additional comparison between the example result of the equivalent source method of gravity response and the synthetic geological model (300). As shown in FIG. 3F, the curve (360a) is an example of the modeled weathering layer depth profile (207) generated using the equivalent source method of gravity response, the data points (360c) are example estimated weathering layer depth values derived from the seismic uphole survey data (205) and used as constraint in generating the curve (360a), and the curve (360b) is an inversion result of the pre-defined curve (310) in the synthetic geological model (300). The curves (360a, 360b) and the data points (360c) are superimposed with the interface (301a) and layer (302) of the synthetic geological model (300) replicated from FIG. 3A above. The comparison between the curves (360a, 360b), data points (360c), and the interface (301a) show good agreement to indicate the efficacy of the method to estimate the depth of the weathering layer using gravity response as described above.

Embodiments provide at least the following advantages: (i) providing an alternative estimate of the base of the weathering layer from gravity data, (ii) reliable inversion of the separated weathering layer gravity response using seismic uphole data as constraints, (iii) fast linear inversion solution that is semi-independent of choices of the parameters values (i.e., the equivalent source layer depth and the regularization parameter), (iv) reduced errors in static correction of near-surface layer leading to improved seismic image, and (v) improved identification of potential wellsite(s) in oilfield development.

Embodiments may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (for example, node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method to estimate a depth profile of a weathering layer in a subterranean formation of a field, comprising:
    obtaining seismic uphole survey data;
    obtaining gravity survey data of the field;
    generating an equivalent source density profile based on the gravity survey data, wherein the equivalent source density profile describes a set of equivalent gravitational sources to substitute rock layers of the subterranean formation;
    generating an equivalent source gravity response based on the equivalent source density profile, wherein the equivalent source gravity response excludes a gravity contribution from the weathering layer;
    calculating a separated weathering layer gravity response based on a difference between the gravity survey data and the equivalent source gravity response, wherein the separated weathering layer gravity response corresponds to the gravity contribution from the weathering layer;
    generating a modeled weathering layer depth profile based on the separated weathering layer gravity response; and
    facilitating a field development operation based on the modeled weathering layer depth profile,
    wherein the modeled weathering layer depth profile is generated by applying a linear inversion process to the separated weathering layer gravity response,
    wherein the linear inversion process is constrained based on the seismic uphole survey data.

2. The method of claim 1,
    wherein the equivalent source density profile is generated by applying a linear inversion process to the gravity survey data.

3. The method of claim 1,
    wherein the linear inversion process minimizes a Tikhonov parametric function using a least-square approach.

4. The method of claim 3,
    wherein the Tikhonov parametric function is based on a regularization parameter that is selected using an L-curve method.

5. An analysis and modeling system for estimating a depth profile of a weathering layer in a subterranean formation of a field, comprising:
    a computer processor; and
    memory storing instructions, when executed causing the computer processor to:
        obtain seismic uphole survey data;
        obtain gravity survey data of the field;
        generate an equivalent source density profile based on the gravity survey data, wherein the equivalent source density profile describes a set of equivalent gravitational sources to substitute rock layers of the subterranean formation;
        generate an equivalent source gravity response based on the equivalent source density profile, wherein the equivalent source gravity response excludes gravity contribution from the weathering layer;
        calculate a separated weathering layer gravity response based on a difference between the gravity survey data and the equivalent source gravity response, wherein the separated weathering layer gravity response corresponds to the gravity contribution from the weathering layer;
        generate a modeled weathering layer depth profile based on the separated weathering layer gravity response; and
        facilitate a field development operation based on the modeled weathering layer depth profile,
        wherein the modeled weathering layer depth profile is generated by applying a linear inversion process to the separated weathering layer gravity response,
        wherein the linear inversion process is constrained based on the seismic uphole survey data.

6. The analysis and modeling system of claim 5,
    wherein the equivalent source density profile is generated by applying a linear inversion process to the gravity survey data.

7. The analysis and modeling system of claim 5,
    wherein the linear inversion process minimizes a Tikhonov parametric function using a least-square approach.

8. The analysis and modeling system of claim 7,
    wherein the Tikhonov parametric function is based on a regularization parameter that is selected using an L-curve method.

9. A system for estimating a depth profile of a weathering layer in a subterranean formation of a field, comprising:
    a seismic survey system configured to obtain seismic uphole survey data,
    a gravity survey system configured to obtain gravity survey data of the field;
    an analysis and modeling system configured to:
        generate an equivalent source density profile based on the gravity survey data, wherein the equivalent source density profile describes a set of equivalent gravitational sources to substitute rock layers of the subterranean formation;

generate an equivalent source gravity response based on the equivalent source density profile, wherein the equivalent source gravity response excludes gravity contribution from the weathering layer;

calculate a separated weathering layer gravity response based on a difference between the gravity survey data and the equivalent source gravity response, wherein the separated weathering layer gravity response corresponds to the gravity contribution from the weathering layer; and generate a modeled weathering layer depth profile based on the separated weathering layer gravity response; and a drilling system configured to perform a drilling operation based on the modeled weathering layer depth profile, wherein the modeled weathering layer depth profile is generated by applying a linear inversion process to the separated weathering layer gravity response, wherein the linear inversion process is constrained based on the seismic uphole survey data.

10. The system of claim 9, wherein the linear inversion process minimizes a Tikhonov parametric function using a least-square approach.

11. The system of claim 10, wherein the Tikhonov parametric function is based on a regularization parameter that is selected using an L-curve method.

\* \* \* \* \*